INVENTORS
WILLIAM H. MOORE
ALTON G. BALE JR.
BY
*Andrus + Starke*
Attorneys

Dec. 4, 1962   A. G. BALE, JR., ET AL   3,066,709
POSITION CONTROL FOR POWER DRIVEN MECHANISM
Filed May 27, 1959   3 Sheets-Sheet 2

INVENTORS
WILLIAM H. MOORE
ALTON G. BALE JR.
BY
Andrus & Starke
Attorneys

United States Patent Office 3,066,709
Patented Dec. 4, 1962

3,066,709
POSITION CONTROL FOR POWER DRIVEN MECHANISM
Alton G. Bale, Jr., South Milwaukee, and William H. Moore, Milwaukee, Wis., assignors to Wisconsin Electrical Manufacturing Company, Inc., Milwaukee, Wis., a corporation of Wisconsin
Filed May 27, 1959, Ser. No. 816,170
11 Claims. (Cl. 143—120)

The present invention is directed to position control for power driven mechanism and is particularly directed to a log positioner for a saw mill setworks to automatically position the log for a predetermined depth of cut.

The automatic and remote positioning of work members in a machine is often desirable to protect the machine operators, to eliminate the inherent inaccuracies of manual control and to increase the rate of production. Where the work and the movable supporting parts of the machine are relatively large and heavy, the automatic positioning is complicated by the necessity for considering the inertia in the moving components of the device.

In the present day saw mills, a log which is to be cut into a series of boards is supported on a suitable carriage including a sawmill setworks for movement past a band or circle saw. The setworks includes a plurality of sliding knees mounted on the carriage and simultaneously actuated to position the log with respect to the saw to determine the depth of the cut. The knees are driven in any suitable manner such as by an air or an electric motor.

Remote control of the positioning of the log with respect to the saw is highly desirable to allow rapid successive cuts from the log and to protect the operator from the danger of flying particles incident to breakage of a saw blade and the like. Although automatic log positioning devices are known for sawmill setworks, the heavy weight of the log and the movable supporting structure constitute high inertial forces which make highly accurate positioning of the log and structures extremely difficult in practical constructions.

The high inertial forces can be compensated for by cutting off or reducing the application of the power to the feed means prior to the complete fed of log. After a predetermined time, a suitable brake or the like is applied to the feed means to bring the feed means to a practically instantaneous stop. At the time of the application of the brake, the inertial forces are substantially reduced and the feed means can be brought to a rapid stop to accurately locate the log within the work unit.

The premature cut-off control circuit set forth in the copending application of Alton Bale, Jr., entitled "Automatic Control for Material Distribution," which was filed on November 29, 1957, Serial No. 699,571, and assigned to a common assignee herewith and which issued to U.S. Patent 2,922,610 on January 26, 1960, can be readily adapted to positioning of a log. The above application specifically discloses the premature cut-off in a gravity feed for sand and the like having a post flow of material corresponding generally to the post feed of material in a log positioning apparatus. A pair of voltage signals are established to correspond respectively to the desired feed and to the actual amount of feed. To compensate for post feed of the material, an additional voltage is selectively established in the circuit of either pair of signals to create a predetermined voltage relationship prior to actual occurrence of the corresponding feed.

As applied to a sawmill setworks, the amount of inertia force in the moving components at the time the power drive mechanism is de-energized is determined experimentally or by suitable calculation. A control circuit is then established to create a suitable actuating signal to discontinue energization of the power drive means prematurely generally in accordance with the coasting of the mechanism to a stop position. A brake is automatically applied to bring the workpiece to a rapid and complete stop after the inertia in the apparatus is relatively small and constant for each movement of the work.

The present invention provides a simple control circuit adapted to sequentially sense the de-energization position and the braking position and to effect the desired operation. The circuit incorporates a mechanically resettable sensing means coupled to the workpiece to establish a different output signal in accordance with corresponding workpiece movement. The sensing means is coupled to the workpiece by a releasable connection controlled by the forward drive control. Thus, the sensing means is always reset to the starting position for successive cutting of boards of similar or different thickness.

In accordance with another aspect of the present invention, a potentiometer or the like is coupled through a clutch to the setworks shaft of a sawmill setworks. The potentiometer is biased toward an initial zero position by a device connected to the driven side of the clutch and is driven to establish a signal in accordance with predetermined movement of the log. The signal is employed in a suitable control circuit to effect the above noted control movement of the log.

The potentiometer and clutch are mounted within a housing filled with a suitable oil or the like to protect and prolong the life of the potentiometer. The housing is sealed about the input shaft. A high pressure seal may be employed without loading the components and interfering with the resetting of the potentiometer.

The potentiometer provides a compact, simple and highly accurate apparatus for controlling the movement of the log.

The present invention thus establishes a highly accurate and rapid work positioner for sawmill setworks and the like. The control is a relatively simple and readily maintained unit.

The drawings furnished herewith illustrate the best mode presently contemplated for carrying out the invention.

Figure 1:
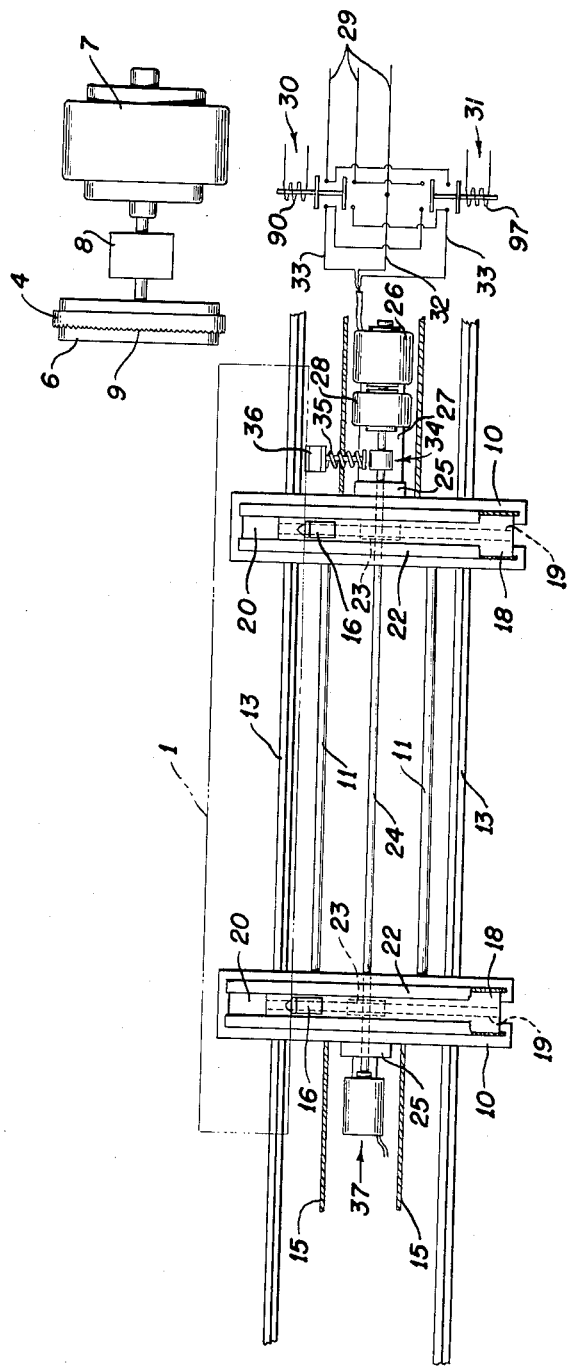
FIG. 1 is a top plan view of a sawmill setworks.
Figure 2:
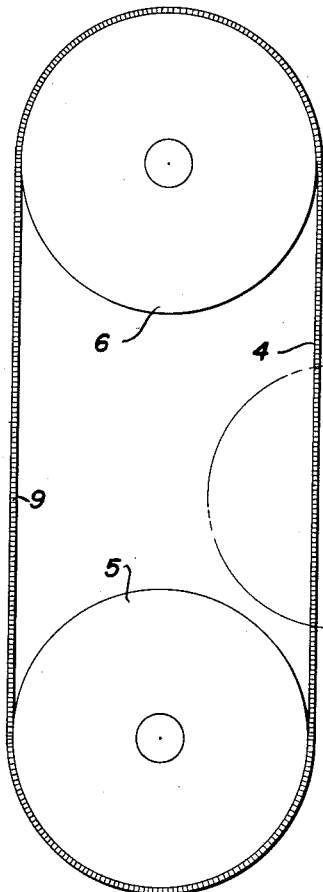
FIG. 2 is an end view of FIG. 1 with parts broken away to show certain details of the construction.

Referring to the drawings and particularly to FIGS. 1 and 2, a log 1 is shown supported upon a carriage 2 incorporating a sawmill setworks. The carriage 2 is adapted to be selectively moved relative to a bandsaw 3 to cut successive boards from the log 1.

The bandsaw 3 comprises an endless flat blade 4 which is mounted in a vertical plane upon a pair of vertically spaced pulley wheels 5 and 6. A motor 7 is connected by a suitable gear reducer 8 to the lower pulley wheel 5 to vertically drive the bandsaw blade 4 relative to the passing log 1. A continuous series of saw teeth 9 are shown on one edge of the blade 4, as shown to the left in FIG. 1, and as log 1 moves from left to right in the drawing, a vertically disposed board, not shown, is cut from the log. By successive movements of the log 1 past the blade, the log 1 is reduced to a series of individual boards.

The carriage 2 comprises horizontally disposed bed plates 10 which are longitudinally spaced and extended perpendicular to the axis of the log 1. A pair of spaced cross braces 11 are secured to the undersurface of the bed plates 10 to form a unitary supporting structure. Supporting wheels 12 are journaled in the cross braces 11 adjacent the bed plates 10 and rest of a pair of correspondingly spaced stationary tracks 13. The adjacent surfaces of the wheels 12 and the correspondingly spaced tracks 13 are formed with a mating V-shaped configuration 14 to hold the carriage movably upon the tracks 13.

A pair of cables 15 are connected to end bed plates 10 to move the log 1 relative to the saw blade 4 and thereby effect a severance of a portion of the log 1 in the illustrated embodiment of the invention. Steam actuated pistons, not shown, are also conventionally employed to move the log 1.

A pair of knees 16, constituting the driven members of the sawmill setworks, are slidably supported one each upon the bed plates 10 for lateral movement toward and away from the saw blade 4. The illustrated knees 16 and associated elements are identical and therefore only one is specifically described.

The knee 16 is generally an L-shaped member having an upstanding leg which bears against the backside of the log 1. A pair of suitable hooks or dogs 17 are pivotably secured to the upstanding leg of the knee 16 and are adapted to releasably grasp the log. The dogs 17 securely hold the log 1 in position on the carriage during the positioning and severing of the log. The knee 16 is welded or otherwise rigidly secured to the upper surface of a straight gear rack 18 which is selectively moved to position the log 1 relative to the blade 4.

Figure 3:
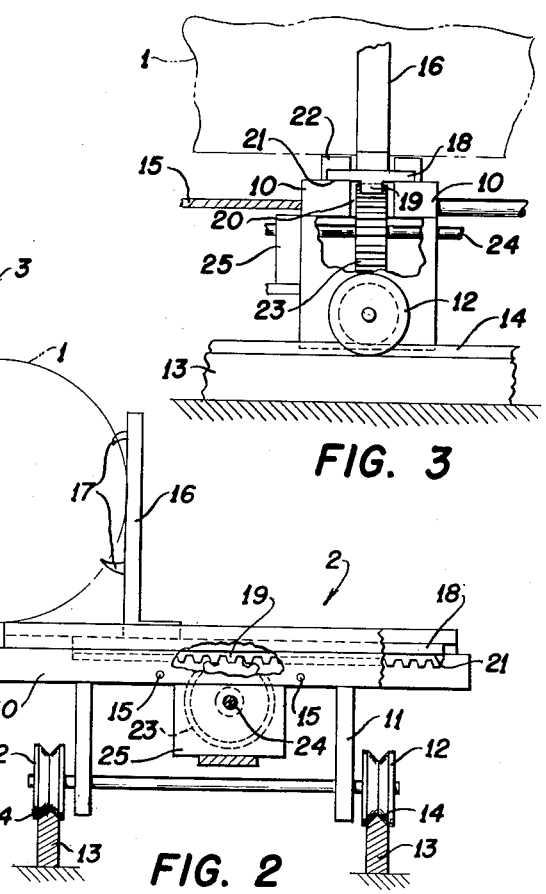
FIG. 3 is a fragmentary end view of a supporting structure shown in FIGS. 1 and 2.

The gear rack 18 extends laterally of the log 1 and is slidably supported upon the bed plate 10. Referring particularly to FIGS. 2 and 3, gear teeth 19 are formed on the central undersurface of the rack 18 and extend downwardly through a slot 20 in the bed plate 10. The adjacent rack undersurfaces 21 ride upon the spaced portions of the bed plate 10 to slidably support the rack 18. Suitable inverted L-shaped brackets 22 are secured to the bed plate 10 immediately adjacent the opposite sides of the rack 18 and extend over the upper surface of the rack toward each other to form a raceway for the rack. The upper horizontal portions of the brackets 22 are spaced to allow free movement of the knee 16 therebetween incident to movement of the rack.

A pinion gear 23 is supported in mesh with the gear teeth 19 of rack 18 and is selectively driven to position the knee 16 and the log 1.

A shaft 24 extends parallel to the position of the log between the cross braces 11 and is coupled to pinion gear 23. The shaft 24 is rotatably journaled in suitable depending bearing brackets 25 which are secured to the undersurface of one of each pair of the carriage bed plates 10.

Referring to FIG. 1, a knee positioning motor 26 is supported on a supporting bracket 27 for simultaneous movement with the carriage 2. The motor 26 is aligned with shaft 24 and a gear reducer 28 connects the adjacent ends of the motor shaft and shaft 24.

The illustrated motor 26 is a conventional motor energized from an incoming power source, not shown, to drive the shaft 24 and the attached pinion gear 23 to selectively position the log 1 relative to the bandsaw 4. The illustrated motor is a three-phase, reversible-type drive motor having a set of three energizing leads adapted to be selectively connected to the incoming three-phase power lines 29 by a forward drive contactor 30 and a reverse drive contactor 31. The power leads to the motor 26 include a common lead 32 similarly connected to the power source for both the forward and the reverse drive. The other two leads 33 to motor 26 are alternately reversely connected to the corresponding lines 29 by the contactors 30 and 31 to establish a forward or reverse drive of motor 26 in a conventional manner.

A positive acting brake 34, shown diagrammatically as a spring-set, friction-type brake, although an air solenoid brake, a magnetically set brake or the like may be used, is secured to the gear shaft 24 and includes a biasing spring 35 which biases the brake to a set position to allow rapid stopping of the movement of the knees 16, as subsequently described. An electrically controlled solenoid 36 is attached to the brake 34 and upon energization overcomes the force of spring 35 to allow rotation of the shaft 24. A suitable clutch, not shown, may also be connected between the brake and the motor to decouple shaft 24 from motor 26 incident to application of the brake.

In accordance with the illustrated embodiment of the invention, a position sensing unit 37 is secured to the opposite end of the setworks shaft 24 to establish different output signals which are calibrated with respect to preselected movements of the knees 16 and consequently the log 1. The output signal is employed to automatically position the log, as subsequently described.

Figure 4:
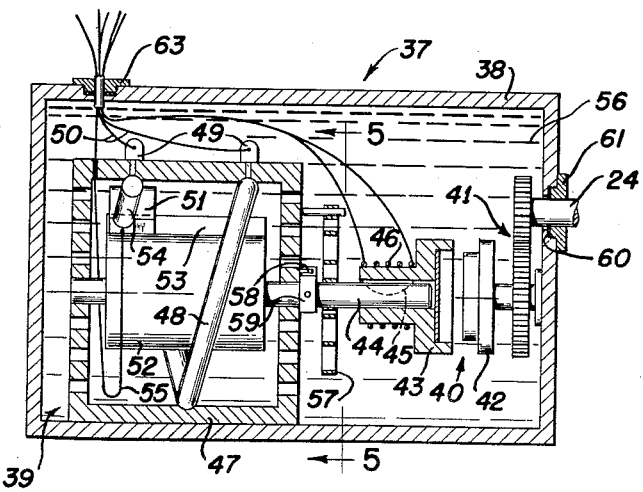
FIG. 4 is an enlarged view of a position sensing potentiometer shown in FIG. 1.
Figure 5:
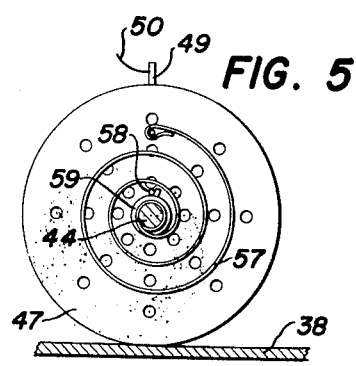
FIG. 5 is a view taken on line 5—5 of FIG. 4.

Referring particularly to FIGS. 4 and 5, the illustrated position sensing unit 37 includes sealed housing 38 enclosing a potentiometer 39, a clutch 40 and a speed reducing gear train 41.

The gear train 41 is employed where the movement of shaft 24 must be reduced for satisfactory functioning of the potentiometer 39. The input to the illustrated gear train 41 is fixedly secured to the incoming end of setworks shaft 24 in any suitable manner and establishes a reduced output. The friction clutch 40 is connected to the output of the gear train 41 and to the input of the potentiometer 37 to position the potentiometer in proportion to the rotation of the shaft 24.

The friction clutch 40 includes a driving member 42 which is rigidly secured to the output of the gear train and a driven member 43 which is secured to the potentiometer 39. Driven member 43 is slidably mounted on the input shaft 44 of the potentiometer 39 by a key and slot 45 for axial movement into and out of engagement with the driving member 42. An electromagnetic coil 46 is coupled to the driven member 43 and when energized, forces the driven member 43 into clutching engagement with the driving member 42 to drive the potentiometer 39.

The sensing potentiometer 39 includes a drum housing 47 of suitable material mounted within housing 38 and carrying a single-turn, helical resistance element 48 secured to and insulated from the inner wall of the housing in any conventional manner.

Suitable connectors 49 to opposite ends of resistance element 48 are secured in the wall of housing 47 and connected to incoming power leads 50 which extend outwardly through an opening in the drum housing 47 and the outer housing 38. A sliding contact 51 is mounted upon a rotatable contact carrier 52 which is journaled in the end walls of housing 47 and integrally formed with the potentiometer shaft 44. The radially inner wall of contact 51 is axially slotted to slidably mount the contact upon a radial bar-like projection 53 for axial position on the contact carrier 52. The projection 53 extends coextensively of the single-turn resistance element 48.

The contact carrier 52 is formed of a suitable insulating material to maintain electrical isolation of the sliding contact 51. The contact 51 is provided with an arcuate recess 54 on the radially outer surface generally corresponding to the diameter of the conductor forming the single-turn resistance element 48. The arcuate recess meshes with the single-turn resistance element 48 such that the single-turn resistance element 48 acts as a screw thread to progressively axially position the movable contact 51 in accordance with a single rotation of the contact carrier 52.

An insulated output lead 55 is connected to the sliding contact 51 and extends outwardly of the housings 38 and 47 with the power leads 50. The lead 55 is loosely wound about the carrier 52 to allow the axial movement of the contact 51.

The voltage on the sliding contact 51 and the output lead 55 is a function of the axial position of the contact 51 with respect to the single-turn resistance element 48. A suitable insulating and lubricating oil 56 fills the housings 38 and 47 to increase the life of the potentiometer 39. The drum housing 47 for potentiometer 39 includes a plurality of openings to allow free entry of oil 56 into the housing. The outer housing 38 is sealed to prevent leakage of the oil 56.

A band spring 57 encircles the potentiometer shaft 44 exteriorly of the housing 47 and is rigidly secured at opposite ends to the shaft 44 and to housing 47. The spring 57 is stressed to bias the shaft 44 and integral contact carrier 52 and positions the contact 51 in the starting position with the contact 51 in engagement with the left end of single-turn resistance element 48, as viewed in FIG. 4.

A stop pin 58 is secured to the shaft 44 adjacent housing 47 which carries a stop member 59 in the path of pin 58. The pin 58 and member 59 are engaged incident to the start positioning of the contact 51 to absorb the force of spring 57. An external stop is employed for purposes of simplicity and ruggedness of construction.

For purpose of illustration, the left end of the resistance element 48 is presumed to be connected to the low or ground side of the incoming power source, not shown, and the opposite end is connected to the high side. The corresponding low potential is selected as the zero end of the potentiometer scale. The potential of the sliding contact 51 then increases as the contact moves from left to right across the potentiometer resistance element 48 in accordance with the increased voltage drop between the left end of resistance element 48 and the contact 51.

The voltage is calibrated in accordance with the desired depth of cuts to be taken from log 1. Normally, a ten-inch maximum cut is employed in commercial apparatus.

The setworks shaft 24 projected through the end wall of the outer housing 38 is coupled to the gear train 41 to drive the potentiometer 39 and establish an output signal which can be employed to automatically control the movement of the setworks.

A high pressure rotating seal closes the opening about rotating shaft 24 in the illustrated embodiment of the invention as follows. The illustrated seal is conventionally constructed having a compressible sealing material 60 disposed within a shaft encircling recess in housing 38 which threadedly receives a packing nut 61. The nut 61 is threaded into the recess to tightly compress the material about the shaft 24 and positively seal the opening against oil leakage. A similar seal 63 or the like, is provided adjacent the opening in housing 38 for the several leads to the potentiometer to seal the housing 38 and prevent oil leakage.

The bath of oil 56 is essential primarily to extend the life of the potentiometer 39 and therefore could be confined to the drum housing 47.

However, the shaft sealing material 60 is then necessarily applied about the potentiometer shaft 44 and substantially loads the shaft. Consequently, the return spring 57 would have to develop sufficient torque to overcome this load, as well as to return the contact 51 to the starting position. Thus, the present invention provides a very simple, inexpensive and practical construction for immersing the potentiometer 39 in oil 56.

The position sensing potentiometer 39 is connected in an automatic control circuit to automatically position the log 1 in response to a suitable input signal voltage.

Figure 6:
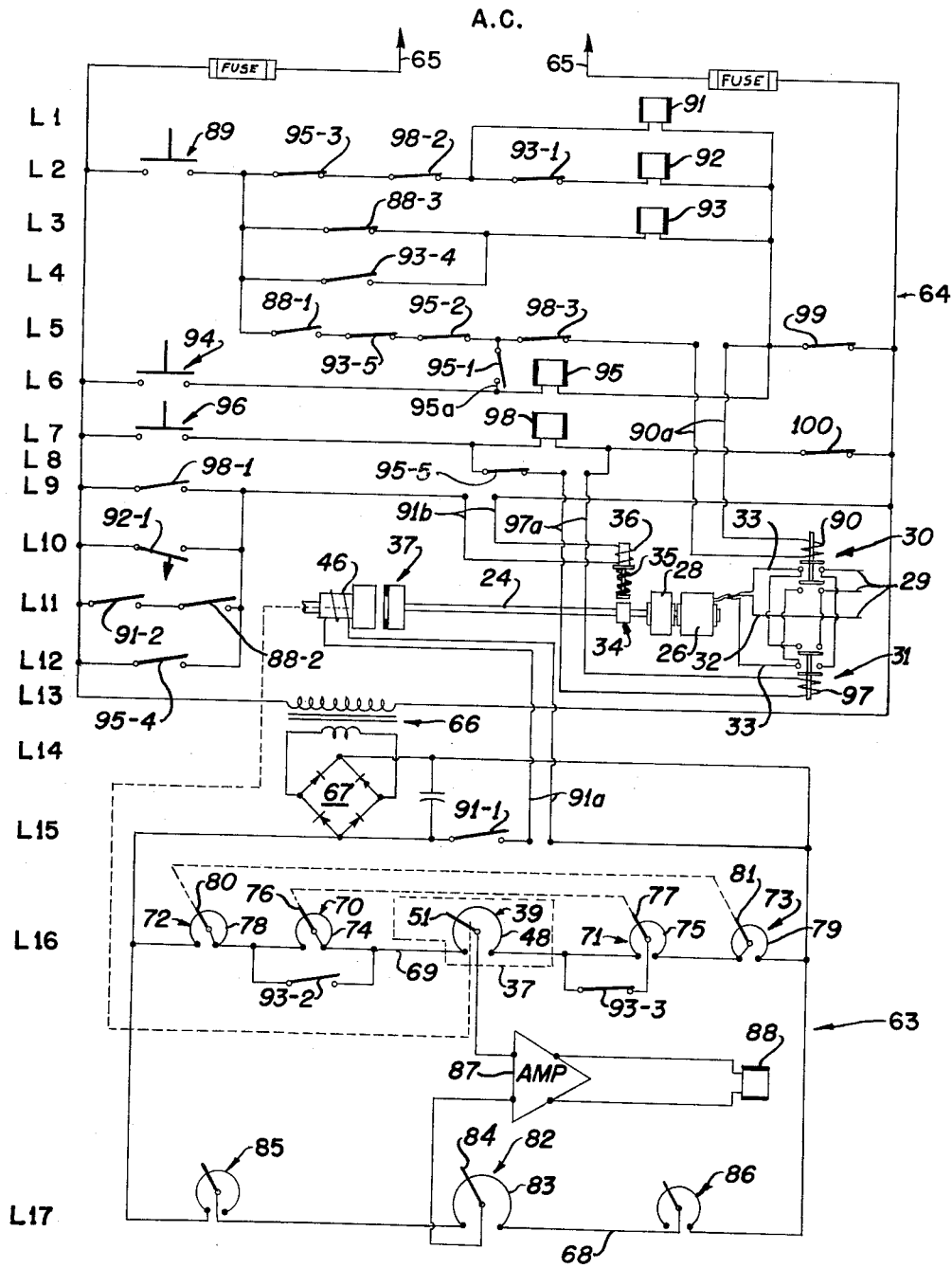
FIG. 6 is a schematic electrical circuit for an automatic sawmill setworks control incorporating the sensing potentiometer shown in FIG. 3.

Referring particularly to FIG. 6, a preferred control circuit is schematically shown including a low voltage sensing and control circuit 63 to establish suitable log positioning signals which control a power circuit 64 for the motor, brake coil and the other power components of the setworks. The circuit portions 63 and 64 are connected to a set of incoming power lines 65 which are of any suitable variety such as the conventional 110 volts, 60 cycle distribution lines.

For purposes of simplicity and clarity of explanation, the various electrical elements are shown in branch lines labeled L–1, L–2, etc. connected to the incoming power lines 65. The various relays are shown with the contacts detached for clarity and avoidance of an undue multiplicity of connecting leads. The relays and associated contacts are coded by numbering the relay winding and similarly numbering the associated contacts with different sub-numbers for each set of contacts of a relay.

A step-down transformer 66 in branch line L–13 reduces the voltage applied to the control circuit 63 from power lines 65 to establish a low voltage control unit. A full-wave, bridge-type rectifier 67 is connected across the output of the step-down transformer 66 to establish a direct current between branch lines L–14 and L–15 which is supplied to the control circuit. The low-voltage, direct-current power allows relatively inexpensive and small components to be employed in the control circuit 63.

The illustrated circuit 63 generally includes a preset branch circuit 68 in branch line L–17 and a moving or log position sensing branch circuit 69 in branch line L–16 which are connected in parallel circuit with each other across the rectifier 67.

The position sensing branch circuit 69 includes the helical resistance element 48 of the potentiometer 39. The element 48 is connected across rectifier 67 in series with a pair of premature motor cutoff potentiometers 70 and 71 and a pair of brake advance potentiometers 72 and 73. One of each pair of the potentiometers 70–73 is connected to the electrically opposite side of the potentiometer 39. It is arbitrarily assumed that the left power line 65 in FIG. 6 is the low potential side for purposes of further description.

The motor cutoff potentiometers 70 and 71 each include a serially connected winding 74 and 75 in line L–16 and ganged movable taps 76 and 77 for simultaneous movement. Tap 76 is connected to short circuit the high potential side of the associated winding 74 while tap 77 is connected to short circuit the low potential side of the associated winding 75. The total resistance inserted in series with the sensing potentiometer 39 is therefore a constant value for all settings of motor cutoff potentiometers 70 and 71. The voltage drop across the sensing potentiometer 39 is therefore constant. However, adjustment of the potentiometers 70 and 71 shifts each and every voltage position on the potentiometer 39 in accordance with the voltage drop appearing across the potentiometer 70 and connected circuit.

Similarly, the brake advance potentiometers 72 and 73 include windings 78 and 79 in line L–16 which are connected in series circuit to electrically opposite sides of the potentiometer 39 and in series with windings 74 and 75. Movable contacts 80 and 81 on the respective potentiometer windings 78 and 79 are ganged for simultaneous inverse connection of the potentiometers in the series circuit. Consequently, a constant voltage drop is inserted in series with the other potentiometers.

The voltage drop across the sensing potentiometers 39 is therefore maintained at a constant value regardless of the setting of the potentiometers 70–73. However, the absolute value of the voltage signal appearing on the contact 51 of the sensing potentiometer 39 is shifted in accordance with the presetting and switching, as subsequently described, of the adjusting potentiometers 70–73 to effect an accurate location of the log 1 with respect to the saw blade 4.

The preset branch circuit 68 of the control circuit 63 includes a manually adjustable potentiometer 82 having a winding 83 in line L–17 corresponding to the potentiometer element 48. Winding 83 is connected across the rectifier 67 and calibrated in accordance with the possible positioning of log 1. A movable contact 84 engaging the potentiometer winding 83 allows establishment of a preselected voltage calibrated to the desired movement of the knee 16 and the log 1.

Although not illustrated, a suitable graduated dial or the like is preferably provided in cooperation with the movable contact 84 for ready and simple control of the apparatus.

A pair of balancing potentiometers 85 and 86 are connected in series to the electrically opposite sides of the potentiometer 82. The balancing potentiometers 85 and 86 are adjusted in accordance with the total voltage drop inserted in the position sensing circuit 69 by the potentiometers 70—73. The balancing potentiometers 85 and 86 thus assure that the total voltage drop appearing across the preset potentiometer 82 and the position sensing potentiometer 39 are identical.

The potentials of contact 84 of the preset potentiometer 82 and of the contact 51 of the position sensing potentiometer 39 are compared to automatically control the movement of the log 1 to the final cutting position in accordance with the relative voltage level of the two signals.

A suitable amplifier 87 includes a pair of inputs which are connected respectively to contacts 51 and 84. In the illustrated embodiment of the invention, the amplifier 87 conducts only if the potential of the input potentiometer contact 84 is greater than the potential of the positioning sensing potentiometer contact 51.

A sensing relay 88 is connected across the output of the amplifier 87 for selective energization in accordance with the relative potential of the contacts 84 and 51. The sensing relay 88 controls three sets of contacts respectively numbered 88–1 in line L–5, 88–2 in line L–11, and 88–3 in line L–3 in the operating power circuit 64 to automatically control the positioning of the log 1.

Referring particularly to the operating power circuit 64, a manually controlled switch 89 in line L–2 is connected in series circuit with the sensing relay contacts 88–1 in line L–5 and an operating coil 90 connected in line L–5 by leads 90a of the motor contactor 30 which is connected in the forward drive line 33, as shown in FIG. 1.

The manually controlled switch 89 is biased to an open position in any suitable manner, not shown, and must be positively held in the closed position by the operator during the complete cycle. If the operator releases the switch 89, the power circuit to the forward motor operating coil 90 opens and immediately discontinues feed of the log.

The manually controlled switch 89 in line L–2 is also connected in a series circuit with a brake and clutch control relay 91 in line L–1 across the power lines 65.

The relay 91 controls the release of the brake winding 36 of the brake 34, shown in FIG. 1, and the engagement of the potentiometer clutch winding 46 of potentiometer clutch 40, shown in FIG. 4, through a pair of normally open contacts 91–1 in line L–15 and 91–2 in line L–11.

The normally open contacts 91–1 are connected in series in line L–15 by leads 91a with the potentiometer clutch coil 46 of the potentiometer sensing unit 37 in the low voltage control circuit 63. When relay 91 is energized, the contacts 91–1 close and energize the clutch coil 46. The hub acts as the core of an electromagnet and moves the driven member 43 into engagement with the member 42 to operatively couple the potentiometer 39 to the setworks shaft 24 incident to energization of relay 91. The potentiometer shaft 44 and the contact carrier 52 are then positioned in accordance with the movement of the setworks shaft 24.

The second set of normally open relay contacts 91–2 are connected in a series circuit in lines L–11 and L–19 with the contacts 88–2 and the brake solenoid 36 which is connected by leads 91b in the operating power circuit 64 to control the braking of the setworks shaft 24. When the brake solenoid 36 is not energized, the brake 35 is set and prevents movement of the setworks shaft 24. The brake 35 is released by energization of solenoid 36 to allow movement of the setworks shaft 24.

The relay contacts 91–2 are interlocked in a series circuit in line L–11 with the second set of sensing relay contacts 88–2 which are normally open. The closing of manual control switch 89 in line L–2 to energize relay 91 as previously described does not energize the brake solenoid 36 until the sensing relay 88 is energized to close the contacts 88–2. Consequently, movement of the setworks shaft 24 is prevented because of a sensed null signal from the sensing relay 88.

If an unbalance signal is received, the brake 34 is released and the motor 26 is simultaneously energized to drive the pinion 23 and rack 18. The knees 16 and the supported log 1 then move forwardly toward the saw blade 4.

The motor 26 simultaneously drives the sensing potentiometer unit 37 and increases the potential appearing on the sensing potentiometer contact 51 of potentiometer 39 in line L–16. When the potential of the sensing potentiometer contact 51 is substantially equal to the potential of the preset potentiometer contact 84 of potentiometer 82 in line L–17, a null signal is established and the amplifier 87 is biased to cut off and discontinue the output signal. The sensing relay 88 is consequently de-energized and the associated relay contacts 88–1 and 88–2 in line L–5 of the motor contactor circuit and in line L–11 of the brake control circuit, respectively, open.

The opening of relay contacts 88–1 in line L–5 breaks the circuit to the motor 26. The opening of relay contacts 88–2 in line L–11 opens the previously described circuit to the brake solenoid 36 which is maintained energized, however, as presently to be described.

In accordance with the present invention, the premature motor cutoff potentiometers 70 and 71 are preset to electrically shift the sensing potentiometer contact 51 to reach an electrical cutoff potential and establish a null signal at amplifier 87 and sensing relay 88 prior to the final preselected stop position of the log. Suitable switching then operatively disconnects the potentiometers 70 and 71 and re-establishes the control circuit as subsequently described for more accurate location of the log.

To prevent application of the brake 35 during the required switching time, a timing relay 92 is connected in series in line L–2 with the manual control switch 89 in the power operating circuit. The timing relay 92 controls a set of normally open relay contacts 92–1 which are connected in line L–10 and in parallel circuit with the sensing relay contacts 88–2 and the brake and clutch solenoid relay contacts 91–2 which are in line L–11 of the previously described circuit to brake solenoid 36. The timing relay 92 is constructed to effect rapid closing and timed opening of the contacts 92–1, as diagrammatically shown by the vertical arrow in FIG. 6.

The timing relay 92 is electrically interlocked with the sensing relay 88 through a premature cutoff relay 93 in line L–3 of the control circuit 64.

Relay 93 is connected to the power lines 65 in series in line L–3 with the normally closed contacts 88–3 of sensing relay 88 and the control switch 89 in line L–2. Therefore, when relay 88 is energized, the contacts 88–3 are held open and prevent energizing of relay 93. When the manual control switch 89 is depressed and the sensing relay 88 subsequently de-energized incident to a premature null balance signal, the contacts 88–3 close and the relay 93 is energized.

Relay 93 controls a set of normally closed contacts 93–1 in line L–2 which are connected in series with the timing relay coil 92. The associated relay contacts 93–1 are opened incident to energization of relay 93 to prevent energization of the timer relay 92 during the de-energization of the sensing relay 88. When the null or balanced signal to amplifier 87 is established and the relay 88 de-energized, relay contacts 88-3 in line L-3 close. The relay 93 is thereby energized and contacts 93-1 in line L-3 open to break the circuit to the timer 92. The timing relay contacts 92-1 in line L-10 remain closed for a predetermined time to maintain energization of the brake solenoid 36 in line L-8. Consequently, application of the brake to the setworks shaft 24 is prevented and the knees 16 and log 1 thus continue to coast during the movement of relay contacts 93-2 and 93-3 of relay 93. The final position is established by subsequent controlled application of the brake.

The two sets of contacts 93-2 and 93-3 of relay 93 are connected in circuit with line L-16 of the control circuit 63. The contacts 93-2 are normally open contacts and are connected in parallel with the premature motor cutoff potentiometer 70 to operatively remove the potentiometer 70 from the circuit incident to the first null condition. Thus, when the first null position is established, relay 93 is energized and contacts 93-2 close and establish a by-pass or short circuit about the potentiometer 70. The resistance between the low potential line 65 and contact 76 is thus operatively removed from the circuit.

The relay contacts 93-3 are normally closed contacts which are connected in series with the tap 77 of the premature motor cutoff potentiometer 71 and in parallel with the low voltage portion of the potentiometer 71 in line L-16. The low voltage portion is consequently normally short circuited by the low resistance path through the contacts 93-3 and tap 77. When relay 93 is energized and opens contacts 93-3, the by-pass circuit is opened and the current must flow through the entire resistance of the potentiometer 71.

In the de-energized status of relay 93, the premature motor cutoff potentiometers 70 and 71 are operatively connected to the opposite sides of the sensing potentiometer 39. The energization of relay 93 shifts the total voltage drop appearing across potentiometers 70 and 71 to the high potential side of the sensing potentiometer 39. Consequently, the potential at every point on the position sensing potentiometer resistance element 48 is reduced by the amount of the voltage drop which existed across the premature cutoff potentiometer 70. The potential of the position sensing potentiometer contact 51 is effectively reduced and the potential of the contact 84 of the input potentiometer 82 is again the greater. Consequently, an output signal appears across the amplifier 87 and power is again supplied to the sensing relay 88 which picks up the associated contacts 88-1 in line L-5 through 88-3 in line L-3 incident to the energization of relay 93 in line L-3 and the consequent closing of contacts 93-2 and opening of contacts 93-3 in line L-15.

The cutoff control potentiometer relay 93 also controls a set of normally open latching contacts 93-4 in line L-4 which are connected in parallel with the normally closed null sensing relay contacts 88-3 in line L-3. Consequently, when the relay 88 is again energized and the normally closed contacts 88-3 open, the relay 93 in line L-3 is maintained energized through contacts 93-4 and is latched across the power lines 65 until such time as the manual switch 89 is opened.

The relay 93 further controls a set of normally closed contacts 93-5 in line L-5 which are connected in the series circuit to the forward drive motor contactor 90. The energization of relay 93 in response to the first null sensing position of the control circuit 63, opens the relay contacts 93-5 to prevent forward drive energizing of the contactor 90 and motor 26 for the balance of the cycle.

The power circuit is then in a condition where no positive power is supplied to the knees 16 of the setworks apparatus.

However, the re-energization of the sensing relay 88 incident to the operative disconnection of the premature motor cutoff potentiometers 70 and 71 in line L-16 again closes the relay contacts 88-2 in line L-11 for the circuit to the setworks brake solenoid 36 in line L-9. The contacts 88-2 close before the timer contacts 92-1 in line L-10 move to the open position and remain closed until the sensing relay 88 is again de-energized. Consequently, the brake solenoid 36 in line L-9 is maintained energized until the sensing relay 88 is de-energized and establishes a null signal. The setworks shaft 24 is therefore free to coast to the final stop position as preset on the potentiometer 82 in line L-17, dissipating the inertia in log 1 and the setworks components.

Subsequently and during the coasting period, the timer contacts 92-1 in line L-10 open because of the de-energization of relay 92 in line L-2 and returns the timing circuit to standby.

As the log 1 and setworks component coast toward the stop position, the position sensing contact 51 is correspondingly moved across the single-turn resistance element 48 in line L-16 through the gear train 41 and clutch 40. The potential of the sensing contact 51 increases and again approaches the potential of the input contact 84 of potentiometer 82 in line L-17.

The brake advance potentiometers 72 and 73 are in line L-16 for the sensing branch circuit 69 of circuit 63 and the voltage signal on the position sensing contact 51 is shifted in accordance with the voltage drop appearing across the low voltage portion of the brake advance potentiometer 72 between the low voltage line 65 and contact 80. Consequently, the potential of the position sensing contact 51 equals the potential of the input contact 84 prematurely or shortly before the log 1 is actually moved the amount set on the input potentiometer.

The brake advance potentiometer 72 is preset to establish a premature cutoff during the final moments of coasting and by an amount corresponding to the slight movement of the log and the setworks components subsequent to the application of the brake. When the second null position is attained and relay 88 de-energized, the relay contacts 88-2 in line L-11 open and break the circuit to the brake solenoid 36 in line L-9. The brake is set and brings the setworks components and the log 1 to an essentially instantaneous stop.

The inertia in the log and setworks components is relatively low at the moment of braking and consequently the log can be brought to rapid standstill to accurately position the log.

The control button 89 in line L-2 is released to reset the control circuit 63 and 64 to standby for subsequent movement of the log 1 by a similar or different travel depending on the setting of potentiometer 82 in line L-17.

When button 89 is released, the clutch coil 46 in line L-15 is de-energized and the band spring 57 rapidly actuates the potentiometer 39 to standby with contact 51 in the initial starting position. The stop pin 58 engages member 59 and to limit the return movement of the contact.

After the carriage 2 is moved to effect a severance of a board from the log 1, the control button 89 is again actuated to position the log 1 for a subsequent cut.

Manual control is provided to allow the necessary initial squaring of the log 1 and any desired withdrawal of the log with respect to the blade 4 in the illustrated embodiment of the invention as follows.

A manual override forward switch 94, generally similar to switch 89, is connected in series in line L-6 with an override relay 95 to the incoming power lines 65.

The relay 95 controls a first set of normally open contacts 95-1 which are connected in series with the override switch 94 and the forward drive motor contactor 90 in a jumper lead between lines L-5 and L-6. Consequently, when override switch 94 is closed, the forward motor contactor 90 is energized independently of the balance of the automatic control circuit and the knees 16 are moved forwardly to position the log.

The relay 95 also controls a pair of normally closed contacts 95-2 in line L-5 and 95-3 in line L-2.

The relay contacts 95–2 in line L–5 are connected in the series circuit with normally open contacts 88–1 and Line L–5 and with the manual control start switch 89 in Line L–2 and the forward drive contactor 90. When the relay 95 is energized, the contacts 95–2 open and the automatic control circuit for the forward energization of motor 26 is effectively disconnected from the circuit.

The relay contacts 95–3 in line L–2 are connected in the series circuit comprising the manual control start switch 89 in line L–2 and the potentiometer and brake control relay 91 in line L–1 in parallel with the timing relay 92 in line L–2. Consequently, when relay 95 is energized, the relay contacts 95–3 open and prevent accidental energization of the brake control relay 91 and the timing relay 92. The automatic portion of the control circuit to the brake solenoid 36 is effectively disconnected from the circuit.

The relay 95 in line L–6 further controls a set of normally open contacts 95–4 in line L–12 which are connected in series with the brake solenoid 36 in line L–8 directly across the incoming power lines 65. Consequently, when relay 95 is energized, the relay contacts 95–4 close and energize the brake solenoid 36. The brake 35 is thereby released and the carriage 2 is free to move incident to the energization of the drive motor 26.

Thus, by actuation of the override forward switch 94, the log 1 may be positioned toward the saw blade 4 independently of the automatic control circuit.

A recede or withdrawal control switch 96 in line L–7 is connected in series with a recede motor relay winding 97 in line L–9 of relay 31, shown in FIG. 1, to control backward movement or withdrawal of the log 1 with respect to the saw blade 4. Energization of relay winding 97 closes a set of normally open contacts in the reverse drive line 33 to the motor 26 to correspondingly rotate the setworks shaft 24.

A set of normally closed contacts 95–5 in line L–8 of the forward override relay 95 in line L–6 is connected in series with the relay winding 97 which is connected in line L–8 by leads 97a and the switch 96. The relay contacts 95–5 are normally closed and in the absence of actuation of override forward switch 94 to permit energization of the relay 95. However, if the forward drive switch 94 is closed and relay 95 energized, the associated contacts 95–5 open and prevent simultaneous energization of the motor recede relay winding 97.

An interlock relay 98 in line L–7 is connected in parallel with the recede motor relay 97 and the relay contacts 95–5 for energization incident to actuation of switch 96 in line L–7. The relay 98 controls a set of normally open contacts 98–1 in line L–9 which are connected in series with the brake solenoid 36 in line L–9 across the power line 65 to permit independent energization of the brake solenoid 36.

The relay 98 also actuates a set of normally closed contacts 98–2 in line L–2 which are connected in series with the start control switch 89 and separately with the potentiometer and brake control relay 91 in line L–1 and the timer relay 92 in line L–2. When the relay 98 is energized, contacts 98–2 in line L–2 open and effectively disconnect this portion of the automatic control circuit.

The relay 98 also controls a set of normally closed contacts 98–3 in line L–5 which are connected in series with the forward override switch 94 in line L–6 through contacts 95–1 in lead 95a and the forward drive motor relay 90 in line L–5 to prevent energization of the forward motor relay if the recede motor switch 96 in line L–7 is moved to the closed position.

Suitable limit switches 99 in line L–5 and 100 in line L–7 are connected in series with the motor control relays 90 in line L–5 and 97 in line L–8, respectively, and are suitably mounted, not shown, on the setworks in the over-limit path of the moving knees 16. The switches 99 and 100 are consequently actuated to open the corresponding circuit to relay 90 and 97 incident to predetermined over-extended movement of the knees 16.

Although the illustrated embodiment of the invention is described with free coasting movement of the setworks, the motor may also be energized or operated with a reduced output during the coasting period within the scope of the present invention.

The position control of the present invention provides a relatively simple and accurate positioning of a log or similar work member. A long-life potentiometer is provided which can be economically and commercially incorporated into an electrical control system.

Various modes of carrying out the invention are contemplated as being within the scope of the following claims particularly pointing out and distinctly claiming the subject matter which is regarded as the invention.

We claim:

1. A log positioning control for successively positioning a log in a saw mill having a power driven setworks and brake, which comprises a sensing device releasably coupled to respond to the movement of the log and to establish an electrical control signal having a continuously varying characteristic calibrated to the movement of the log during its entire movement, reset means to reset the sensing device to an initial starting position, means connected to the sensing device and responsive to a first predetermined characteristic of the control signal established by the sensing device to remove at least a portion of the power from the power driven means incident to predetermined partial movement of the log and subsequently responsive to a second predetermined characteristic of the control signal established by the sensing device to apply the brake incident to predetermined subsequent movement of the log, and means to decouple the sensing device for independent movement and to establish the reset means to reset the sensing device to starting position incident to final positioning of the log.

2. A log positioning control for successively positioning a log in a saw mill having an electrically controlled setworks and brake, which comprises a potentiometer having a movable contact member coupled to respond to the movement of the log and to establish a voltage signal calibrated to the movement of the log, reset means to reset the movable member to an initial starting position, a control circuit including the potentiometer and adapted to establish a first voltage output of the potentiometer with the setworks spaced from a final position to apply power to the setworks and the brake to release the brake and allow movement of the setworks and to establish a second voltage output calibrated to the movement of the setwork for removing at least a portion of the power only from the setworks and establish a third voltage output calibrated to the movement of the setworks after the establishment of said second voltage output for removing the power from the brake, and means to automatically actuate the reset means to reset the movable contact member to the starting position prior to a subsequent positioning of the log.

3. In a control for a sawmill setworks having a driven shaft, a potentiometer having a movable contact member and having a rotating input means movable from a starting position to continuously shift the movable contact member in accordance with the movement of the input means, clutch means having an input shaft adapted to be connected to the driven shaft and adapted to selectively couple said input means to said driven shaft, means connected to said clutch means to selectively engage the clutch means, biasing means connected to the rotating input means on the output side of the clutch means to bias the rotating input means to a starting position, a housing enclosing said potentiometer and said clutch means with said input shaft extending outwardly through a sealed opening, and a fluid within said housing to condition and protect the potentiometer.

4. In a control for a sawmill setworks having a driven shaft, a potentiometer having a single-turn resistance element and a movable contact member connected to a rotating input shaft and positioned on the element in accordance with the movement of the input shaft, clutch means having a first shaft adapted to be connected to the driven shaft and an output shaft connected to said input shaft to selectively couple said input shaft to said driven shaft to drive the input shaft in a predetermined direction, biasing means connected to the rotating input shaft to continuously bias the rotating input shaft in an opposite direction, stop means limiting rotation of the input shaft to one revolution, a housing enclosing said potentiometer and said clutch means with said first shaft of the clutch extending outwardly through a sealed opening, and a fluid within said housing to condition and protect the potentiometer.

5. In a control for a sawmill setworks having a driven shaft, a potentiometer having an insulating housing carrying a voltage element and having a movable contact connected to a rotating input shaft to continuously shift the movable contact member on said voltage element in accordance with the movement of the input shaft, clutch means having a driven member and a driving member, means to attach the driving member to the input shaft, a gear reducer connected to said driven member, a connecting shaft to connect the gear reducer to said driven shaft, biasing means connected to the rotating input shaft to bias the rotating input shaft oppositely to the drive of the driven shaft, a housing enclosing said potentiometer and said clutch means and said gear reducer with said connecting shaft extending outwardly through a sealed opening, and a fluid filling said housing to condition and protect the potentiometer.

6. A log positioner control for sawmill setworks driven by a motor and having an electroresponsive brake, which comprises a sensing potentiometer means having a movable tap biased to an initial position, electroresponsive clutch means connecting said movable tap to the sawmill setworks for synchronous movement to establish a voltage in accordance with movement of the setworks, a preset potentiometer means connected in parallel with said first potentiometer means to establish a voltage signal in accordance with the desired movement of the setworks, cutoff means to shift the absolute values of the voltages of said potentiometers and to maintain like voltage drops across said potentiometers, signal comparing means connected to said sensing potentiometer and said preset potentiometer to establish a control signal incident to predetermined inputs corresponding to required movement of the setworks, conditioning means responsive to said control signal to simultaneously condition the motor and the brake, main control means to simultaneously energize the motor and release the brake in cooperation with said conditioning means and to operate the clutch means, switching means to selectively connect said cutoff means in circuit with said sensing potentiometer and said preset potentiometer in accordance with maximum inertia in the setworks and with the inertia after substantial coasting of the setworks, means actuated by said conditioning means and connected to actuate said switching means, and timing switch means connected in an independent circuit with said brake and actuated by said conditioning means to maintain said brake released during actuation of said switching means.

7. A log positioner control for sawmill setworks driven by a motor and having an electroresponsive brake, which comprises initiating means to establish an electrical signal in accordance with desired movement of the setworks, electroresponsive means connected to said initiating means and adapted to simultaneously complete power circuits to the motor and the brake, means operatively coupled to said initiating means to establish a first preselected output signal to deactivate said electroresponsive means prior to final positioning of the setworks and to establish a second preselected output signal to deactivate said electroresponsive means incident final positioning of the setworks, switch means responsive to the first preselected output signal to de-energize the motor and separately energize the brake, and timer switch means connected to respond to said electroresponsive means, said timer switch means being connected to said brake to maintain timed release of said brake incident to initial deactivation of said electroresponsive means.

8. A log positioner control for sawmill setworks driven by a motor and having an electroresponsive brake having a normally brake set position, which comprises initiating means to establish an electrical signal having a characteristic varying in accordance with desired movement of the setworks, electroresponsive means connected to said initiating means and adapted to simultaneously complete power circuits to the motor to drive the setworks and the brake to release the brake, control means operatively coupled to said initiating means to establish a preselected characteristic of said electrical signal to deactivate said electroresponsive means prior to final positioning of the setworks, switch means having a first condition to actuate said control means to establish said preselected characteristic of said electrical signal in accordance with the maximum running inertia of the setworks and a second condition to actuate said control means to establish said preselected characteristic of said electrical signal in accordance with a reduced inertia, means responsive to operation of the electroresponsive means to move the switch means from said first condtion to said second condition, and timer switch means being connected to said brake to maintain timed release of said brake incident to initial deactivation of said electroresponsive means to positively maintain the brake energization during operation of the switch means.

9. A log positioner control for sawmill setworks driven by a motor and having an electroresponsive brake, which comprises initiating means to establish an electrical signal in accordance with desired movement of the setworks, electroresponsive means connected to said initiating means and adapted to simultaneously complete power circuits to the motor and the brake, control means operatively coupled to said initiating means to establish a preselected output signal to deactivate said electroresponsive means prior to final positioning of the setworks, switch means having a first condition to actuate said control means to establish said preselected output signal in accordance with the maximum running inertia of the setworks and a second condition to actuate said control means to establish said preselected output signal in accordance with a reduced coasting inertia, timer switch means being connected to said brake to maintain timed release of said brake incident to initial deactivation of said electroresponsive means, second electroresponsive means controlled by said first named electroresponsive means to simultaneously establish the second condition of the switch means and to initiate the timer cycle incident to a first de-energization of the first electroresponsive means, and latch means to maintain said second electroresponsive means in an actuated condition incident to initial energization thereof.

10. An automatic control circuit for a sawmill setworks and the like having a motor and an electroresponsive brake, input means to generate voltage signals calibrated in accordance with the desired movement, sensing means coupled to the setworks to generate corresponding voltage signals in accordance with the actual movement, a comparing circuit connected to said input means and said sensing means having an electromagnetic output switch means, a main control switch, a circuit including said motor and said output switch and said main control switch to energize said motor incident to energization of the output switch means, a second circuit including said brake and said output switch means to release said brake incident to energization of the output switch means, control switch means for said input means and said sensing means to establish actuation of the output switch means prior to final positioning of the setworks, a third circuit including said control switch means and said output switch means to actuate said control switch means incident to actuation of said output switch means, an electromagnetic timer connected in an independent circuit with said brake, a circuit including said timer and said control switch means to actuate the timer incident to actuation of the control switch means and to thereby maintain said brake released for a preselected period, and latch means to prevent resetting of the timer after said preselected period until the power circuit is opened.

11. An automatic control circuit for a sawmill setworks and the like having a motor and an electroresponsive brake for positioning a log for a cutting cycle, signal generating means to establish a control signal in accordance with the movement of the log, cutoff means to adjust said generating means to establish a position signal prior to the final positioning of the setworks in accordance with predetermined inertia forces in the setworks, a first relay means having contacts setting said cutoff means in accordance with full running inertia of the setworks and adapted to set the cutoff means for a substantially reduced inertia of the setworks, a second relay means actuated by said signal generating means and having circuit controlling contacts, a circuit including said motor and contacts of said second relay means to control energization of the motor, a second circuit including said brake and contacts of said second relay means to simultaneously control said brake, a third circuit including said first relay means and third contacts of said second relay means to initially energize and actuate the first relay means incident to establishment of a motor de-energizing signal from said generating means, contact means of said first relay means being connected in series with said brake and in parallel with the brake contacts of the second relay means, and contact means of said first relay means being connected in parallel with the third contacts of said second relay means to maintain the energization of said first relay means independently of said second relay means after initial energization of the first relay means.

References Cited in the file of this patent

UNITED STATES PATENTS

| | | |
|---|---|---|
| 2,118,944 | Purdy | May 31, 1938 |
| 2,175,822 | Best | Oct. 10, 1939 |
| 2,247,955 | Lewis et al. | July 1, 1941 |
| 2,334,137 | Wagner et al. | Nov. 9, 1943 |
| 2,498,654 | Deakin | Feb. 28, 1950 |
| 2,503,438 | Gruner | Apr. 11, 1950 |
| 2,739,626 | Southworth et al. | Mar. 27, 1956 |
| 2,767,363 | Chubb | Oct. 16, 1956 |
| 2,807,293 | Smith et al. | Sept. 24, 1957 |
| 2,888,047 | Worth et al. | May 26, 1959 |
| 2,899,990 | Landis | Aug. 18, 1959 |
| 2,922,610 | Bale | Jan. 26, 1960 |

FOREIGN PATENTS

| | | |
|---|---|---|
| 807,777 | Great Britain | Jan. 21, 1959 |

UNITED STATES PATENT OFFICE
CERTIFICATE OF CORRECTION

Patent No. 3,066,709 December 4, 1962

Alton G. Bale, Jr., et al.

It is hereby certified that error appears in the above numbered patent requiring correction and that the said Letters Patent should read as corrected below.

Column 1, line 45, for "fed" read -- feed --; column 3, line 7, for "of", first occurrence, read -- on --; column 6, line 62, for "potentiometers" read -- potentiometer --; column 11, line 42, strike out "to".

Signed and sealed this 7th day of May 1963.

(SEAL)
Attest:

ERNEST W. SWIDER
Attesting Officer

DAVID L. LADD
Commissioner of Patents